Patented Apr. 7, 1942

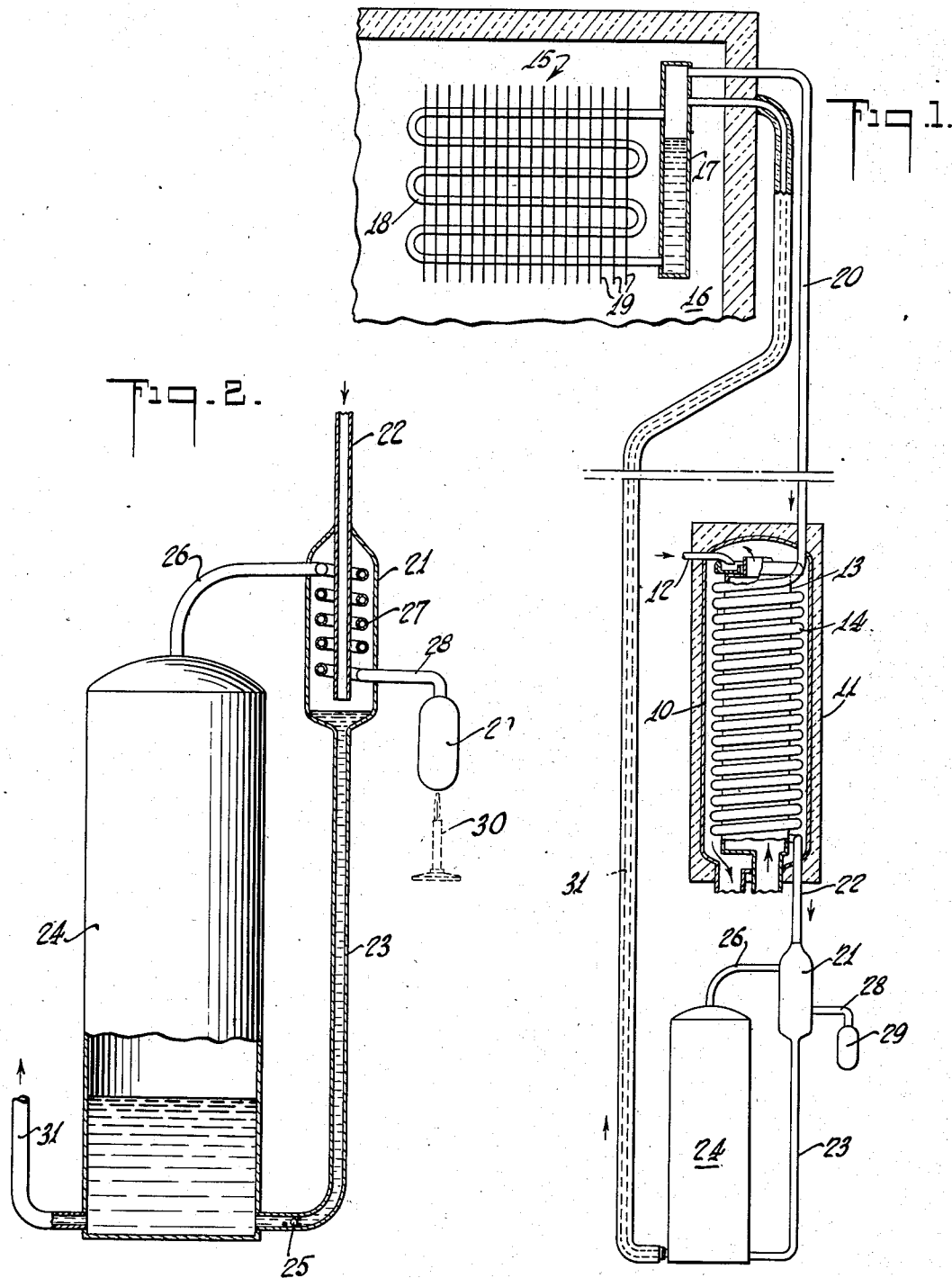

2,279,082

UNITED STATES PATENT OFFICE 2,279,082

REFRIGERATION

Albert R. Thomas, Evansville, Ind., assignor to Servel, Inc., New York, N. Y., a corporation of Delaware Application June 28, 1940, Serial No. 342,891

6 Claims. (Cl. 62—125)

This invention relates to refrigeration, and more particularly to a system for transferring heat so that cooling may be produced at a place above a source of refrigeration.

It is an object of the invention to provide a simple arrangement for elevating liquid heat transfer fluid in such a system: In the drawing:

Fig. 1 illustrates diagrammatically a refrigerating system embodying my invention; and Fig. 2 is an enlarged view, partly in vertical section, of the lower part of the system shown in Fig. 1.

In Fig. 1 there is shown a cooling unit or evaporator 10 of a refrigeration apparatus of a uniform pressure absorption type like that described in my Patent No. 2,207,838, granted July 14, 1940. The cooling unit 10 constitutes a source of refrigeration and comprises an outer shell which is embedded in a heat insulating material 11. A liquid refrigerant, such as ammonia, is introduced into the upper part of the cooling unit 10 through a conduit 12. An inert gas, such as hydrogen, enters the upper part of the cooling unit from the upper end of a cylinder 13 disposed within the shell. The liquid ammonia evaporates and diffuses into the hydrogen with consequent absorption of heat from the surroundings to produce a refrigerating effect. This refrigerating effect is utilized to cool and liquefy a volatile fluid flowing through a coil 14 which is arranged about the cylinder 13 and over the successive turns of which the liquid ammonia descends in sheetlike form.

The resulting gas mixture of ammonia and hydrogen flows from the cooling unit 10 to an absorber in which the ammonia is absorbed into a liquid absorbent such as water. The inert hydrogen gas is returned to the cylinder 13 and the enriched absorption liquid is conducted to a generator. By heating the generator, the ammonia is expelled from the absorption solution, liquefied in a condenser and then returned to the cooling unit 10 through conduit 12 to complete the refrigerating cycle. The weakened absorption solution from which the ammonia has been expelled is conducted from the generator to the absorber to absorb ammonia gas. In order to simplify the drawing, the absorber, generator and condenser of the refrigeration apparatus associated with the cooling unit 10 have not been shown, their illustration not being necessary for an understanding of my invention.

The coil 14 which is arranged within and in thermal relation with the cooling unit 10 of the refrigeration apparatus just described, constitutes the condenser of a heat transfer system. The condenser 14 is disposed below an evaporator 15 of the flooded type which is located in a thermally insulated storage space 16 that is to be maintained at a desired low temperature. The evaporator 15 includes a receiver 17 and a looped coil 18 which is provided with heat transfer fins 19 and connected to the receiver 17.

The condenser 14 and evaporator 15 form part of a closed fluid circuit which contains a suitable volatile fluid such as methyl chloride or freon that evaporates within the evaporator 15 and takes up heat thereby producing cold. The vapor flows from the evaporator 15 through a conduit 20 into the condenser 14, and the vapor is cooled and condensed by the cooling unit 10.

Since the condenser 14 is disposed at a lower level than the evaporator 15, means is provided to return the liquid to the evaporator so that cooling may be constantly produced in the storage space 16. This means comprises a vessel 21 which is joined to the bottom of coil 14 by a pipe 22. The open end of pipe 22 projects downward in vessel 21. A pipe 23 connects the bottom of vessel 21 to the lower part of a vessel 24. A check valve 25 is provided in pipe 23 to allow flow of liquid from pipe 23 to vessel 24 but prevent flow in the reverse direction.

A pipe 26 connects the top of vessel 24 with the top of a coil 27 located in vessel 21 and surrounding pipe 22. The bottom of coil 27 is connected by a pipe 28 to a vessel 29. This vessel may be heated in any convenient manner as by atmosphere, by waste heat, or by a heater, representatively shown as a burner 30. The other parts which have been described are enclosed in thermal insulation, not only shown for clarity.

The bottom of vessel 24 is connected by an insulated pipe 31 with the receiver 17 in storage space 16. The operation of the liquid transfer device of this invention is as follows:

Condensed heat transfer fluid flows from coil 14 down pipe 22 into vessel 21. The liquid fills pipe 23 and the vessel or jacket 21 around coil 27. The liquid also backs up in pipe 22 into coil 14, causing the liquid to be sub-cooled, that is, cooled below its condensing temperature. This causes condensation of vapor trapped in coil 27 which produces a reduction in pressure in vessel 24 to which coil 27 is connected. With the reduced pressure in vessel 24, liquid flows past check valve 25 from pipe 23 into vessel 24. The condensate formed in coil 27 drains into the vessel 29 where it is heated. This causes the condensed liquid to vaporize again and raise the pressure in vessel 24. When sufficient pressure is generated in said vessel, the liquid is forced up through pipe 31 into receiver 17. The check valve 25 prevents the liquid from being forced back through pipe 23.

Various changes and modifications may be made within the scope of the invention as set forth in the following claims.

What is claimed is:

1. Refrigeration apparatus including a cooling element and a circuit for volatile heat transfer fluid having a condenser in heat transfer relation with said cooling element, an evaporator located at a level above said condenser, a chamber in said circuit connected for inflow of liquid condensate from said condenser and outflow thereof to said evaporator, and means operated by subcooling of liquid condensate in said condenser to produce intermittent decrease in pressure of vapor in said chamber to cause said inflow of liquid condensate alternately with said outflow which takes place when the pressure resumes.

2. Refrigeration apparatus as set forth in claim 1 in which said means comprises a second condenser connected to said chamber and arranged in heat transfer relation with liquid condensate in a path of flow from said first condenser to said chamber.

3. Refrigeration apparatus as set forth in claim 1 in which said chamber is thermally insulated, and including a heated vessel connected to the upper part of said chamber, and in which said means comprises a second condenser connected to said vessel and arranged in heat transfer relation with liquid condensate in a path of flow from said first condenser to said chamber.

4. A method of cooling which includes simultaneously vaporizing liquid fluid at an upper elevation, condensing vaporized fluid to liquid at a lower elevation, maintaining vapor under pressure in direct contact with said condensed liquid to raise the liquid between said elevations, subcooling condensed liquid, and utilizing the subcooled liquid to intermittently decrease the pressure of said vapor, and forming a body of liquid condensate upon said decrease in pressure to be raised upon increase thereof.

5. Refrigeration apparatus including a cooling element and a circuit for volatile heat transfer fluid having a condenser in heat transfer relation with said cooling element, an evaporator located at a level above said condenser, a chamber in said circuit connected for inflow of liquid condensate from said condenser and outflow thereof to said evaporator, a second condenser connected to the upper part of said chamber, a heat receiving vessel connected to said second condenser and arranged so that liquid formed in said second condenser flows into said vessel, said second condenser being so arranged as to be in contact with liquid in a path of flow from said first condenser to said chamber only when said path of flow is flooded with liquid.

6. Refrigeration apparatus including a cooling element and a circuit for volatile heat transfer fluid having a condenser in heat transfer relation with said cooling element, an evaporator located at a level above said condenser, a liquid transfer chamber, a conduit for liquid from the lower part of said chamber to said evaporator, a second condenser connected to the upper part of said chamber, a heat receiving vessel connected to said condenser and arranged to receive condensate formed in said second condenser, a conduit for vapor from said evaporator to said first condenser, a vessel enclosing said second condenser, a conduit from said first condenser to the lower part of said last vessel, a conduit from the lower part of said last vessel to the lower part of said transfer chamber, and means in said last conduit for permitting flow of liquid only in the direction of said chamber.

ALBERT R. THOMAS.